June 7, 1955        A. O. MONSON        2,710,381

GROUNDING COUPLING

Filed June 29, 1954

ABRAHAM OWEN MONSON,
INVENTOR.

BY Stedman B Hoar

AGENT

United States Patent Office 2,710,381
Patented June 7, 1955

2,710,381

GROUNDING COUPLING

Abraham Owen Monson, Long Beach, Calif.

Application June 29, 1954, Serial No. 440,120

5 Claims. (Cl. 339—14)

This invention relates to a device for bonding an electric ground wire to an electric outlet box or switch box, and has for a general object the provision of a grounding coupling, or wedge, which is efficient as well as simple and economical to manufacture.

A further object of my invention is to provide a grounding coupling in which the electric wire to be connected to the box need only be placed in a groove provided for the purpose and a stud screwed down upon it, a pin having contact with the wire also then making the desired contact with the box.

A further object of my invention is to provide a device of the nature described which may take either the form of the inside nut of a conventional coupling, being substituted therefor, or may take the form of a wedge placed between the inside nut and the box-wall.

In the accompanying drawing, illustrative of presently preferred embodiments of my invention, Fig. 1 is an elevational view of a wedge-type of my coupling, the box being shown in section;

Figure 1:
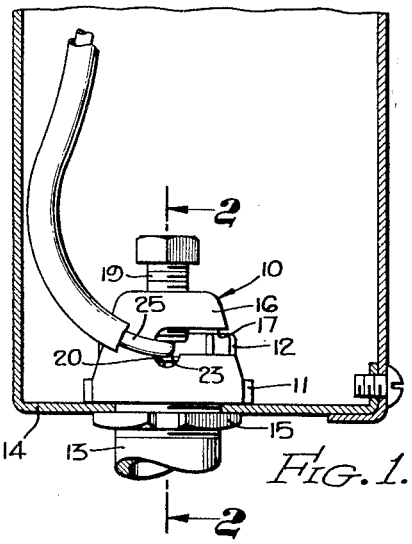
Figure 2:
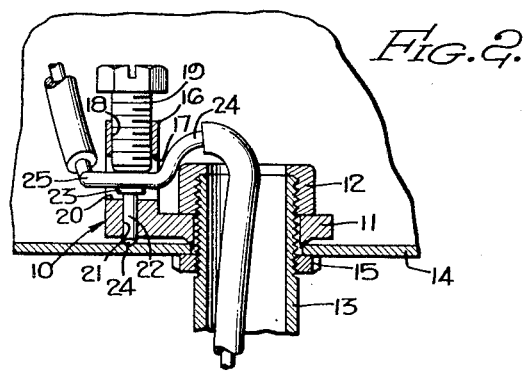
Fig. 2 is a sectional view, taken on the line of section 2—2 of Fig. 1.
Figure 3:
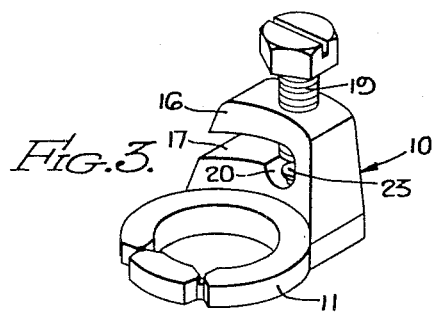
Fig. 3 is a perspective view of the type of coupling or wedge shown in Figs. 1 and 2.

Having reference to the details of the drawing, I have shown in Figs. 1–3 a coupling 10 having a ring 11 which is held as a wedge between the cap nut 12 of a standard cable conduit 13 and an electric box fixture 14. The cable conduit 13 has the usual shallow nut 15 outside the box 14 for tightening the coupling to the box. The upright coupling portion 16 has a slot 17 extending a little more than half-way across it, so as to intersect a threaded hole 18. A set-screw 19 is engaged in the hole 18. The bottom of the slot 17 preferably has a groove 20 directly opposite the hole 18. Extending from the groove 20 in prolongation of the hole 18 is another smaller hole 21 in which is a spike 22. The spike 22 is of sufficient length that when its head 23 is yet wholly within the groove 20 and is unseated upon the wall of the groove, its point 24 extends outwardly beyond the hole 21 and can make contact with the box 14. In other words the spike 22 is slightly overly long to be contained within the hole 21.

When the end of a wire 25 is drawn from the conduit 13 and stripped of its insulation, it is passed through the slot 17 into the groove 20. The set-screw 19 is then screwed into the hole 18, compressing the uninsulated wire against the spike 22 and forcing the spike outwardly to make contact with the box 14. The spike 22 is preferably of copper, to give good conduction. The point 24 of the spike will be driven into the metal of the box 14.

Figure 4:
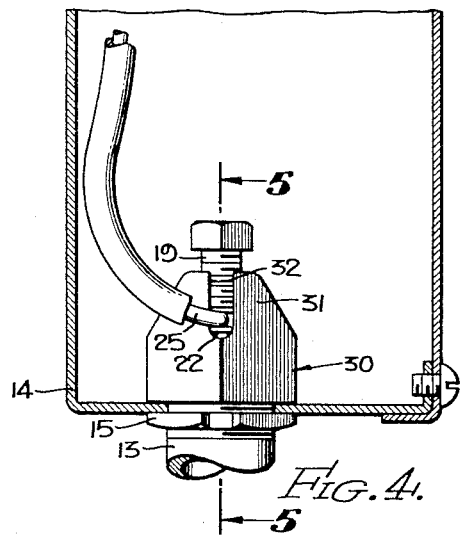
Fig. 4 is a view similar to Fig. 1, showing a modified connection of the type in which the ground connection serves as inside nut.
Figure 5:
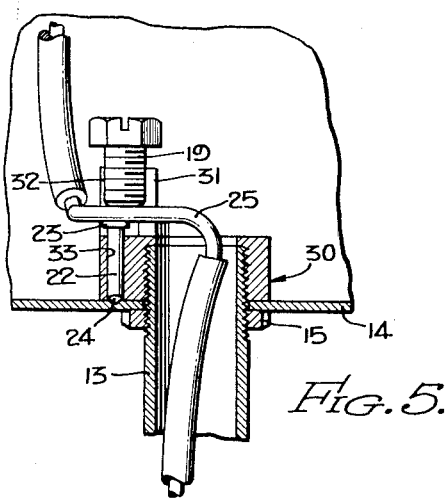
Fig. 5 is a sectional view, taken on the line of section 5—5 of Fig. 4.

In Figs. 4 and 5, I have shown a modified form of my invention in which the coupling acts as inner nut upon the conduit 13, and is screwed directly upon the cable conduit 13, acting in conjunction with the nut 15 to grip the box 14. The coupling has a threaded portion 30 to receive the end of the conduit 13, and a portion 31 at right angles thereto. A slot 32 extends through the portion 31 and is enlarged and tapped to receive the set-screw 19. Opposed to the set-screw 19 is a hole 33, holding the spike 22. In this modification it is necessary either to remove the set-screw 19 momentarily, or to thread the electric wire 25 through the slot 32 under the set-screw. On the other hand, no groove corresponding to groove 20 of the previously described form of my invention is necessary, the wire being unable to escape from the bottom of the slot 32.

Figure 6:
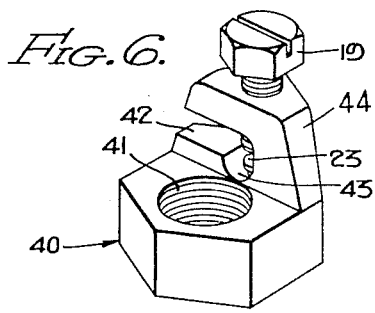
Fig. 6 is a perspective view of a further modification of my invention.

In Fig. 6, I have shown a further modification embodying many of the principles of the two forms of my invention hitherto described. This form, like the one last described, is intended to take the place of the nut on the inside of the box, and has a body portion 40 with a tapped hole 41 for that purpose. At one side of the hole 41 is a portion 44 containing a slot 42, transverse to the axis of the conduit (not shown) as in my first-described embodiment. A set-screw 19 enters the slot 42 transversely and, acting on a wire (not shown), presses a spike 22 in a wire-receiving groove 43. The action will be clear, from the foregoing descriptions.

I wish it understood that further modification may be made without departing from the spirit of my invention, the scope of which I claim as follows:

I claim:

1. A grounding coupling comprising a body for receiving the end of a conduit, including a portion offset laterally from the axis of said body on which said conduit is received having a slot for holding a wire extending from said conduit, a set-screw threadedly engaged in said portion and entering said slot so as to compress a wire against a wall of said slot, a spike having its head in said slot and its body in line with said compression, and means guiding said spike to an electrically conductive element external to said coupling.

2. A grounding coupling as set forth in claim 1 in which said conduit-receiving body is a ring slidably engaging said conduit.

3. A grounding coupling as set forth in claim 1 in which said conduit-receiving body is threaded to receive said conduit.

4. A grounding coupling as set forth in claim 1 in which said slot is transverse to the axis of said conduit and has a groove for holding said wire, said spike having its head in said groove.

5. A grounding coupling as set forth in claim 1 in which said slot is parallel to the axis of said conduit.

References Cited in the file of this patent

UNITED STATES PATENTS 2,531,291     Olson _____ Nov. 21, 1950

FOREIGN PATENTS 484,734     Great Britain _____ May 10, 1938